(12) United States Patent
Mukherjee

(10) Patent No.: US 9,082,220 B2
(45) Date of Patent: Jul. 14, 2015

(54) SYSTEM, METHOD, AND COMPUTER PROGRAM PRODUCT FOR SMOOTHING

(75) Inventor: Nilanjan Mukherjee, Cincinnati, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 2194 days.

(21) Appl. No.: 10/716,386

(22) Filed: Nov. 18, 2003

(65) Prior Publication Data

US 2010/0226589 A1 Sep. 9, 2010

Related U.S. Application Data

(60) Provisional application No. 60/498,085, filed on Aug. 26, 2003.

(51) Int. Cl.
*G06K 9/40* (2006.01)
*G06T 17/20* (2006.01)

(52) U.S. Cl.
CPC .............. *G06T 17/20* (2013.01); *G06T 17/205* (2013.01)

(58) Field of Classification Search
USPC .......................................... 703/2, 6; 345/423
See application file for complete search history.

(56) References Cited

U.S. PATENT DOCUMENTS

| | | | |
|---|---|---|---|
| 5,315,537 A | 5/1994 | Blacker | |
| 5,988,862 A | 11/1999 | Kacyra et al. | |
| 6,473,079 B1 | 10/2002 | Kacyra et al. | |
| 6,678,642 B1 * | 1/2004 | Budge | 703/2 |

OTHER PUBLICATIONS

Nilanjan Mukherjee, "A Hybrid, Variational 3D Smoother for Orphaned Shell Meshes", Sep. 15, 2002, pp. 379-390.
David Field,"Laplacian Smoothing and Delaunay Triangulations", Communications in Applied Numerical Methods, vol. 4, No. 6, Nov. 1988, pp. 709-712.
Scott A. Canann et al., "Optismoothing: An Optimization-Driven Approach to Mesh Smoothing", Finite Elements in Analysis and Design, vol. 13, No. 2/3, 1993, pp. 185-188.
Nina Amenta, "Optimal Point Placement for Mesh Smoothing," Journal of Algorithms 30, pp. 302-322, (1999).
Bala Balendran, "A Direct Smoothing Method for Surface Meshes," 5 pages, (1999).
Frank J. Bossen et al., "A Pliant Method for Anisotropic Mesh Generation," Computer Science Dept., Carnegie Mellon University, 12 pages, (1996).

(Continued)

*Primary Examiner* — Omar Fernandez Rivas
*Assistant Examiner* — Herng-Der Day

(57) ABSTRACT

A system and method for a hybrid, variational, user-controlled, 3D mesh smoothing for orphaned shell meshes. The smoothing model is based on a variational combination of energy and equi-potential minimization theories. A variety of smoothing techniques for predicting a new location for the node-to-smooth are employed. Each node is moved according to a specific smoothing algorithm so as to keep element included angles, skew and distortion to a minimum. The variational smoother selection logic is based on nodal valency and element connectivity pattern of the node to smooth. Results show its consistency with both quadrilateral and quad-dominant meshes with a significant gain over conventional Laplacian schemes in terms of mesh quality, stability, user control and flexibility.

18 Claims, 14 Drawing Sheets

(56) References Cited

OTHER PUBLICATIONS

Scott A. Canann et al., "An Approach to Combined Laplacian and Optimization-Based Smoothing for Triangular, Quadrilateral, and Quad-Dominant Meshes," ANSYS, Inc., 16 pages, (1998).

David A. Field, "Laplacian Smoothing and Delaunay Triangulations," Communications in Applied Numerical Methods, vol. 4, pp. 709-712, (1988).

Lori Freitag et al., "An Efficient Parallel Algorithm for Mesh Smoothing," Computer Science Department, The University of Tennessee, pp. 47-58, (1995).

Lori A. Freitag et al., "A Comparison of Tetrahedral Mesh Improvement Techniques," Mathematics and Computer Science Division, Argonne National Laboratory, 14 pages, (1997).

Lori A. Freitag, "On Combining Laplacian and Optimization-Based Mesh Smoothing Techniques," Mathematics and Computer Science Division, Argonne National Laboratory, 7 pages, (1997).

Robert Haber et al., "A General Two-Dimensional, Graphical Finite Element Preprocessor Utilizing Discrete Transfinite Mappings," International Journal for Numerical Methods in Engineering, vol. 17, pp. 1015-1044, (1981).

David Ives, "Unstructured Boundary Layer Grid Generation," pp. 13-25, (2000).

C. K. Lee et al., "A New Scheme for the Generation of a Graded Quadrilateral Mesh," Computer & Structures, vol. 52, No. 5, pp. 847-857, (1994).

V.N. Parthasarathy, "A Constrained Optimization Approach to Finite Element Mesh Smoothing," Finite Elements in Analysis and Design, 9, pp. 309-320, (1991).

Mark S. Shephard et al., "Automatic Three-Dimensional Mesh Generation by the Finite Octree Technique," International Journal for Numerical Methods in Engineering, vol. 32, pp. 709-749 (1991).

T.K.H. Tam, "Finite Element Mesh Control by Integer Programming," International Journal for Numerical Methods in Engineering, vol. 36, pp. 2581-2605 (1993).

Tian Zhou et al., "An Angle-Based Approach to Two-Dimensional Mesh Smoothing," Carnegie Mellon University, 6 pages, (2000).

Patrick M. Knupp, "Winslow Smoothing on Two-Dimensional Unstructured Meshes," 9 pages (1998).

Patrick M. Knupp, "Applications of Mesh Smoothing: Copy, Morph, and Sweep on Unstructured Quadrilateral Meshes," International Journal for Numerical Methods in Engineering, 45, pp. 37-45 (1999).

* cited by examiner

SYSTEM, METHOD, AND COMPUTER PROGRAM PRODUCT FOR SMOOTHING

CROSS-REFERENCE TO RELATED APPLICATIONS

This application claims the benefit of the filing date of U.S. Provisional Patent Application 60/498,085 filed Aug. 26, 2003, which is hereby incorporated by reference.

TECHNICAL FIELD OF THE INVENTION

The present invention is directed, in general, to finite element processing.

BACKGROUND OF THE INVENTION

With a very strong legacy of finite element data models, in most engineering industries, more and more legacy FEM data is being read in as building blocks for new designs. This is fast changing the engineering design world to an analysis-driven design as opposed to traditional CAD-based design.

In this light, one of the biggest challenges that the designer faces today is to create geometry from legacy FEM data that is partially altered. The first step towards building surfaces or geometry abstractions from the input mesh is to smooth shell meshes in 3D space. Very few 3D smoothers, known today, can meet this challenge. Such a smoother could also be looked at as a preliminary "mesh morphing" technique.

The simplest mesh smoothing technique is Laplacian smoothing where a node is moved to the centroid of its neighboring vertices. This method operates heuristically, and has no control on mesh quality and often throws nodes outside concave domains producing inverted or invalid elements.

Several variants of the Laplacian smoothing technique include "smart" Laplacian methods where element distortion metrices are checked before the node is moved. Length or area weighted Laplacian methods are able to influence repositioning with initial location. In concave domains, however, these techniques still fail to produce stable meshes. Sometimes, area weighted methods help sense inverted elements and can be leveraged by smart Laplacian approaches to prevent moving such nodes. Haber et al. proposed a family of Isoparametric-Laplacian mesh control techniques, meant specially for transfinite meshes. These schemes tend to produce better skewed quadrilaterals but have most of the other Laplacian disadvantages.

In optimization based smoothing, nodes are not moved based on a heuristic algorithm such as Laplacian smoothing, they are moved to minimize a given distortion metric. The distortion metrics are related to the max/min included angles of elements, element skew value, element aspect ratio, element area, element edge length, etc.

One of the early optimization techniques was developed by Parthasarathy and Kodiyalam. They solved a non-linear optimization problem in an effort to repair quad-tree and octree meshes. Shephard and Georges reported similar findings. Amenta et al used linear programming techniques to solve triangular meshes locally. Jacquotte and Coussement developed an optimization based approach for both 2D and 3D structural grids. Freitag et al proposed a local optimization technique for 2D triangular meshes that can serve as the core of an efficient parallel algorithm. Later, Freitag and Oliver-Gooch extended that to 3D grids. These methods produced extremely good quality meshes but involved element repair work like edge-swapping, bad element collapse etc. Moreover the efficiency of these optimization based smoothers are about five to 40 times slower than Laplacian smoothing. Both Freitag and Canann et al later combined several smart Laplacian methods with optimization-based techniques to create hybrid algorithms to improve efficiency. These methods, however, fail to recognize and preserve mapped meshes.

Non-Laplacian, physics-based or non-iterative, direct smoothing algorithms have also emerged in the recent past. Lohner et al used a spring mounted system between nodes to smooth. Shimada, in his bubble packing model, proposed a method where close nodes repel and distant ones attract each other. Bossen and Heckbert proposed an exponential function with similar properties. These models work in 2D space and are not general purpose. A recent direct, non-iterative approach computes artificial stiffness matrices for the mesh to smooth and tries to minimize the strain-energy of the system. While the results are interesting, such methods tend to loose their computational advantage for large models. Tam and Armstrong developed an integer programming based mesh control algorithm for mapped quadrilateral and hexahedral meshes. This method works on a collection of connected subregions and is quite special purpose. Zhou and Shimada have recently proposed an angle smoother in 2D that tends to mount torsion springs between nodes and minimize the system energy. Results prove its merit on certain concave domains and mixed meshes. Winslow smoothing is another efficient technique to reposition nodes of predominantly structured elliptic meshes. Knupp's investigation in this area provides important results. Knupp also proposes "condition numbers" as a good yardstick for measuring mesh quality.

There is a need in the art for a system, process, and computer program product for improved smoothing.

SUMMARY OF THE INVENTION

The preferred embodiment provides a system, method, and computer program product for a hybrid, variational, user-controlled, 3D mesh smoothing for orphaned shell meshes. The smoothing model is based on a variational combination of energy and equi-potential minimization theories. A variety of smoothing techniques for predicting a new location for the node-to-smooth are employed. Each node is moved according to a specific smoothing algorithm so as to keep element included angles, skew and distortion to a minimum. The variational smoother selection logic is based on nodal valency and element connectivity pattern of the node to smooth. Results show its consistency with both quadrilateral and quad-dominant meshes with a significant gain over conventional Laplacian schemes in terms of mesh quality, stability, user control and flexibility.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
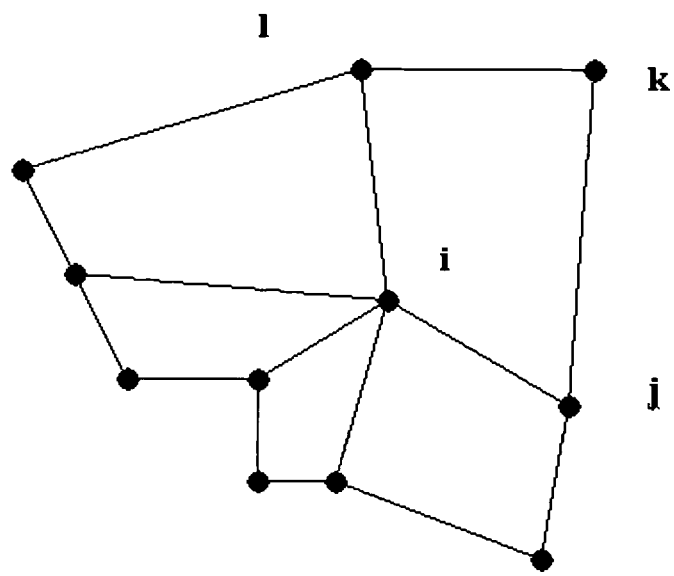
FIG. 1 depicts a typical n-quad grid illustrating a n-quadrilateral connection in accordance with an embodiment of the present invention.

FIGS. 1 through 12, discussed herein, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

The preferred embodiment provides a system and method for a hybrid, variational, user-controlled, 3D mesh smoothing algorithm for orphaned shell meshes. The smoothing model is based on a variational combination of energy and equi-potential minimization theories. A variety of smoothing techniques for predicting a new location for the node-to-smooth are employed. Each node is moved according to a specific smoothing algorithm so as to keep element included angles, skew and distortion to a minimum. The variational smoother selection logic is based on nodal valency and element connectivity pattern of the node to smooth. Results show its consistency with both quadrilateral and quad-dominant meshes with a significant gain over conventional Laplacian schemes in terms of mesh quality, stability, user control and flexibility.

The preferred embodiment discloses a new variational shell mesh smoothing technique in 3D space that symbiotically combines old and some new methods. The variational algorithm smoothes each node according to a specific smoothing technique. The smoothing method selection depends on nodal valency and connectivity pattern of the concerned node and is largely determined based on different smoothing techniques on a variety of mesh patterns. The algorithm used in various embodiments is iterative; works on 1D, 2D and 3D space; is almost as efficient as Laplacian smoothing; gives several controls to the user; does not destroy mapped/structured meshes or mesh regions; does not produce inverted elements; does not move boundary nodes, or nodes on hard points or nodes with loads; and improves element included angles, average element skew and hence mesh quality.

Many users handling geometry-associated meshes desire to move nodes off the surface in an effort to reduce element warp and skew. For geometry associated meshes, this algorithm allows the user to move nodes off the surface within a desired tolerance, if needed.

The preferred embodiment uses different smoothing method for each node in the mesh, including an incenter-based approach for triangles, isoparametric-Laplace for general quad-only meshes, equipotential (Winslow) smoothing for mapped regions, and combined incenter and Laplacian smoothing for free mixed meshes. Further, the process does a quick region check for each node, optionally performs a smart interior angle screening, and optionally constrains the node to move within a specified tolerance.

The governing equation according to one preferred embodiment, for repositioniong node i connected to N elements, is $$Pi' = \sum_{n=1}^{N} Fn(C, V) * \Omega n(C, V) \qquad (1)$$

where Pi'=New position of node i, Fn=Variational weight factor for n-th element $\Omega$n=Positional function for n-th element, C denotes the connectivity pattern of the node, while V indicates its valency.

The hybrid smoother uses various repositioning schemes for different types of mesh units. These schemes are discussed below.

Conventional Laplacian methods tend to ignore the effect of neighboring nodes that are not directly connected to the node-to-smooth. Furthermore, being heuristic and completely independent of element topology, these techniques do not guarantee low skewness for quad elements. This is a strong requirement for most structural engineering applications. Isoparametric mesh generation fundamentals, derived from the shape functions of quadrilateral isoparametric elements, predict location of nodes connected to quadrilateral elements. The preferred embodiment makes a conscious effort to generate grids that adequately represent bounding contours and tend to produce squarish quad elements that have low skew. When this technique is combined with Laplacian grid generation procedures, a more uniform mesh results that have a lower skew value than ordinary Laplacian grids. Such an Isoparametric-Laplacian method is used here as a mesh smoothing technique for n-quad connections where n!=2 or 4. A typical n-quad grid is shown in FIG. 1, which illustrates a n-quadrilateral connection (n!=2,4). i-j-k-l denotes an average quad. i is the node to be smoothed.

From the origin of the isoparametric co-ordinate systems for quadrilateral elements, the new location of node i as shown in FIG. 1 can be expressed as $$Pi' = \frac{1}{N(2-r)} \sum_{n=1}^{N} Wn(Pn_j + Pn_l - rPn_k) \quad (2)$$

where the variational weighting factor and the positional function for each element can be expressed as $$Fn = \frac{Wn}{N(2-r)}; \Omega n = (Pn_j + Pn_l - rPn_k) \quad (2a)$$

and N is the number of elements connected to node I, i-j-k-l represents an average connected quad, r is the coupling factor between Laplacian and isoparametric methods, Pnj, Pnk, Pnl, represent the position vectors of the j-th, k-th and l-th nodes of the n-th connected quad respectively, Pi' represents the new location of the node to smooth, and Wn represents weight factors for each connecting element n such that $$\sum_{n=0}^{N} Wn = 1.0;$$

The weight factors can be constructed in numerous possible ways. Some popular examples are length-weighing, area-weighing, weighing elements based on the included angle they make at the node concerned, etc.

Note that when r=0, equation (2) reduces to Laplace smoothing. When r=1.0, a pure isoparametric grid is produced with quad elements showing very low skewness, but the nodal lines of the mesh become zig-zag. Experience with scheme has proven that r=0.5 results in good quality meshes with an overall skewness that is almost invariably better than the Laplacian variants.

Figure 2A:
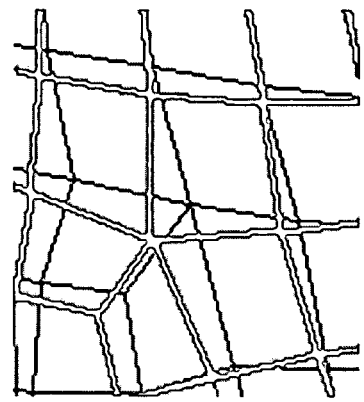
FIGS. 2A-2C illustrate some of the aspects of an isoparametric-laplacian smoothing process in accordance with an embodiment of the present invention.
Figure 2B:
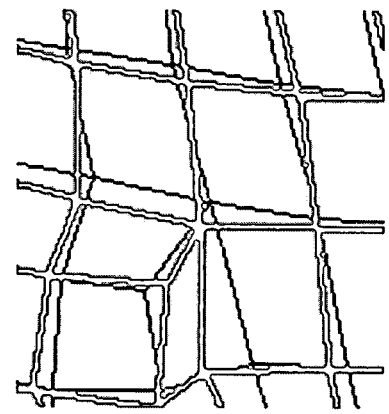
Figure 2C:
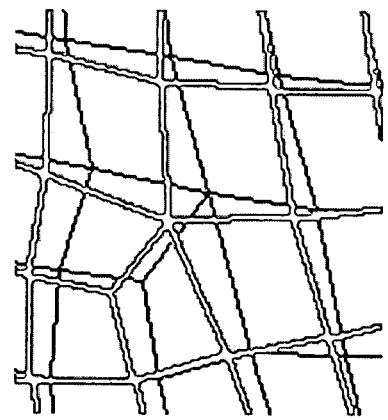

FIGS. 2A-2C illustrate some of the aspects of the isoparametric-laplacian smoothing scheme discussed above. As is evident from FIG. 2A, the simple Laplacian smoother does just a fairly good job smoothing the 5-valent quad connection but the iso-laplace method produces better quad included angles. The isoparametric smoother, on the contrary, tends to produce a lot more skew elements while trying preserve quad-shapes.

FIG. 2A illustrates Laplace smoothing, FIG. 2B illustrates isoparametric smoothing, and FIG. 2C illustrates Iso-Laplace smoothing. Each of these shows a dark smoothed mesh overlaying a thinner original mesh.

Figure 3:
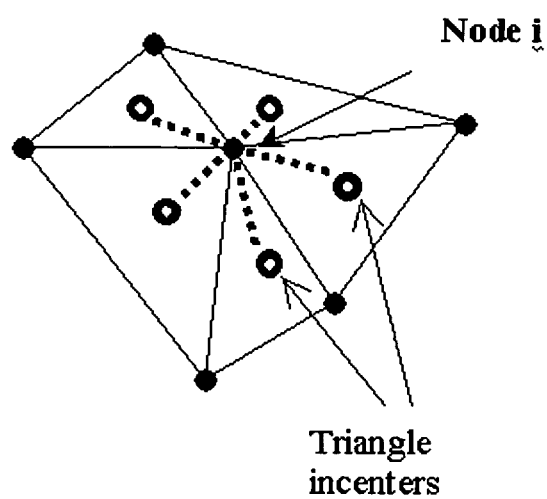
FIG. 3 shows a spring-mounted system in accordance with an embodiment of the present invention.

A new Incenter-Based Smoother scheme is used for triangles only. FIG. 3 shows a spring-mounted system where the node-to-smooth is assumed to be connected by springs to the incenters of the connected triangles. An energy minimization similar to Laplace smoothing leads to the following expressions.

The new position of node i is obtained as $$P_i' = P_i + \sum_{n=1}^{N} W_n(P_n - P_i) \quad (3)$$

where Pi (x, y, z) is the position vector of node I, Pn(x, y, z) is the incenter vector of element n, and N represents the total number of elements connected to node i. The weighing factors Wn account for the initial stiffness of the springs (i.e the effect of initial position of node i). Equation (2) is ambivalent with a length weighted Laplacian method. The weight factors, in this case, can be computed from the length of the incenter vectors as $$W_n = \frac{\|V_n\|}{\sum_{n=1}^{N} \|V_n\|} \quad (3a)$$

where $$V_n = P_n - P_i \quad (3b)$$

Vn is the distance from the concerned node to the incenter of the n-th element.

FIG. 3 shows an all-triangle connection. Springs are connected from the node-to-smooth (i) to the Incenters of the connected triangles.

Figure 4A:
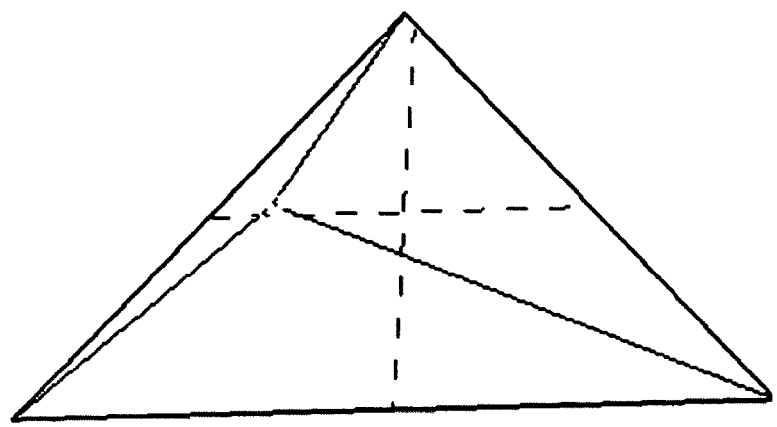
FIGS. 4A-4C illustrate the effectiveness of the disclosed system and method in improving element included angles.
Figure 4B:
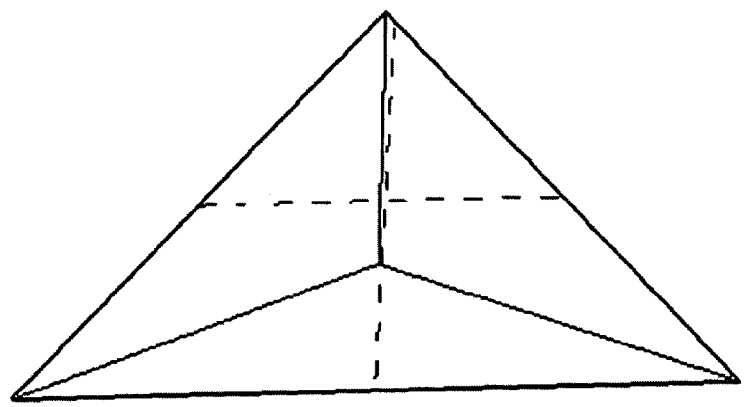
Figure 4C:
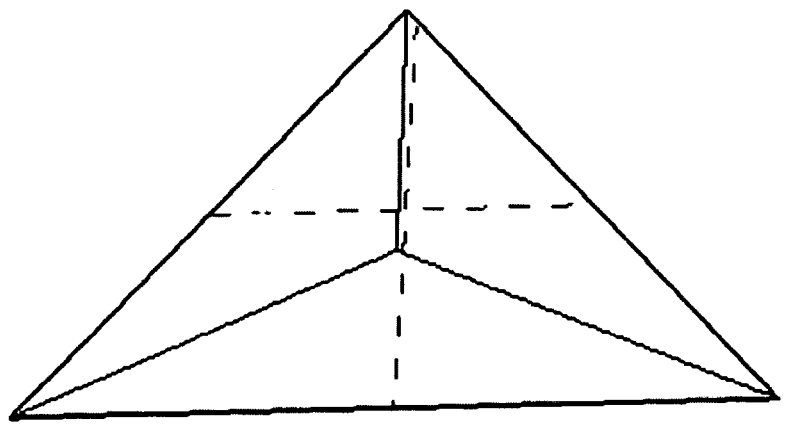

FIGS. 4A-4C illustrate the effectiveness of the disclosed system and method in improving element included angles. Smoothing results are shown for a unit mesh comprising three triangles connected to a single node.

FIG. 4A shows three triangles connected to one interior node. FIG. 4B shows the same after Laplace smoothing. FIG. 4C shows the same after incenter smoothing. The minimum and maximum angles are compared in Table 1.

TABLE 1

Comparison of element included angles

| Smoothing Method | Minimun Element Angle | Maximum Element Angle |
|---|---|---|
| Original Mesh | 3.7 | 171.2 |
| Laplacian smoothing | 17.3 | 137.6 |
| Angle Smoothing [20] | 16.9 | 133.2 |
| Disclosed variational smoothing | 17.4 | 125.7 |

Figure 5:
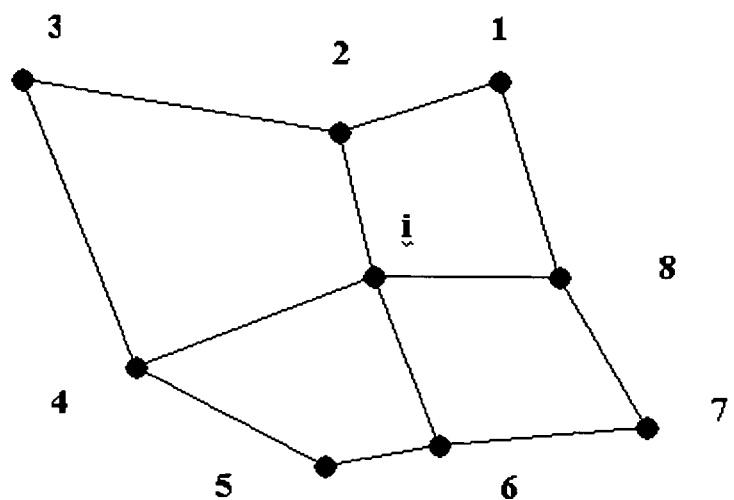
FIG. 5 depicts a node connected to 4 quadrilateral elements.

The equipotential smoothing scheme applies to nodes that are connected to n quads (where n=4) or has 8 neighboring nodes. FIG. 5 depicts a node connected to 4 quadrilateral elements. Neighboring nodes 1,2 . . . 8 are shown.

The governing equation for equipotential (Winslow) smoothing can written for node i as $$\alpha Pi_{\xi\xi} - 2\beta Pi_{\xi\eta} + \gamma Pi_{\eta\eta} = 0; \quad (4)$$

where ξ,η are logical variables that are harmonic in nature, while α, β, γ are constant coefficients that depend on the problem.

FIG. 5 shows a four-quad grid connected to node i. From equations 1 & 4, after some simplification, one obtains an equation similar to equation 3 that describes the new location of the node to smooth, where N=8. The weighing factors of the 8 neighboring nodes are given by $$W_1 = -\beta/2, W_2 = \alpha, W_3 = \beta/2, W_4 = \gamma, W_5 = -\beta/2, W_6 = \alpha,$$
$$W_7 = \beta/2, W_8 = \gamma \quad (4a)$$

where $$\alpha = x_p^2 + y_p^2 + z_p^2 \quad (4b)$$

$$\beta = x_p x_q + y_p y_q + z_p z_q \quad (4c)$$

$$\gamma = x_q^2 + y_q^2 + z_q^2 \quad (4d)$$

and $$x_p = (x_2 - x_6)/2, y_p = (y_2 - y_6)/2, z_p = (z_2 - z_6)/2 \quad (4e)$$

$$x_q = (x_8 - x_4)/2, y_q = (y_8 - y_4)/2, z_q = (z_8 - z_4)/2 \quad (4f)$$

A Combined Incenter-IsoLaplacian smoothing for mixed meshes scheme applies to nodes that are connected to both quads and triangles and do not satisfy the Winslow criteria. For such connections, a Isoparametric-Laplacian approach is used for quads and the incenter-based smoothing approach is used for triangles. The region check is turned on to prevent mesh distortion in concave domains.

Figure 6A:
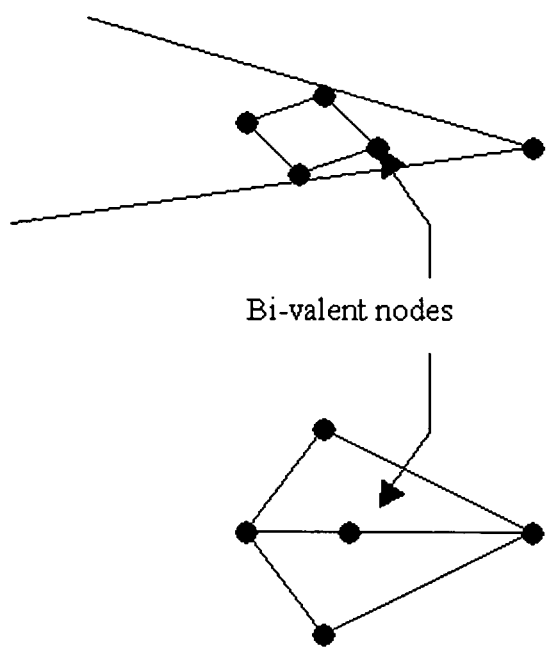
FIGS. 6A and 6B depict a merged single quad in accordance with a preferred embodiment.
Figure 6B:
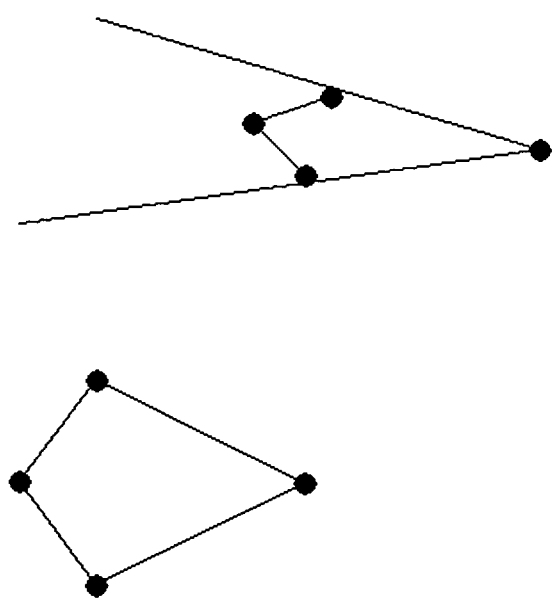

A quad meshes with bivalent nodes scheme is used when we come across a node with a rare valency of 2 (connected to 2 quads). One of these quads is invariably an arrowhead shaped element which is impossible to cure by any smoothing method. For such bivalent nodes, the node to smooth is deleted and the two connecting quads are merged to form a single quad as shown in FIGS. 6A & 6B. FIG. 6A shows elements with bi-valent node, and FIG. 6B shows the Bivalent-node removed, where elements merge.

Angle check: During smoothing, element angles connected to the concerned node are checked to see if they are within the angle limits, or the overall skewness of the connected elements are checked. If all elements connected to the node pass the user-defined criteria, the concerned node is not smoothed. This feature is optional, and when turned on, the smoother works like a smart Laplacian. Node is thus smoothed, only if any included angle of any connected element fails the user-set angular limits at this node. This condition can be mathematically expressed as $$\sigma(P_i); \text{if } \theta max < \alpha_{ji}|_{j=1,N} < \theta min00 \quad (5)$$

where σ is the smoothing operator, σ (P$_i$) indicates node i is smoothed, N denotes number of elements connected to node I, θmax, θmin are the element allowable angular limits, and α$_{ji}$ denotes the included angle of element j at node i.

Figure 7A:
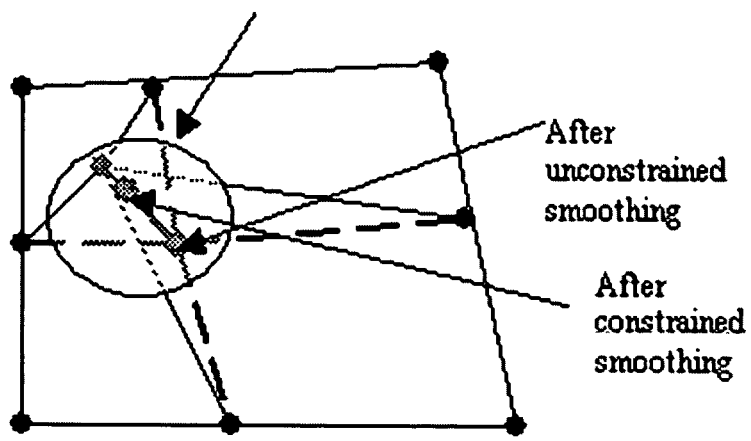
FIGS. 7A and 7B depict a single quad after constrained smoothing in accordance with a preferred embodiment.
Figure 7B:
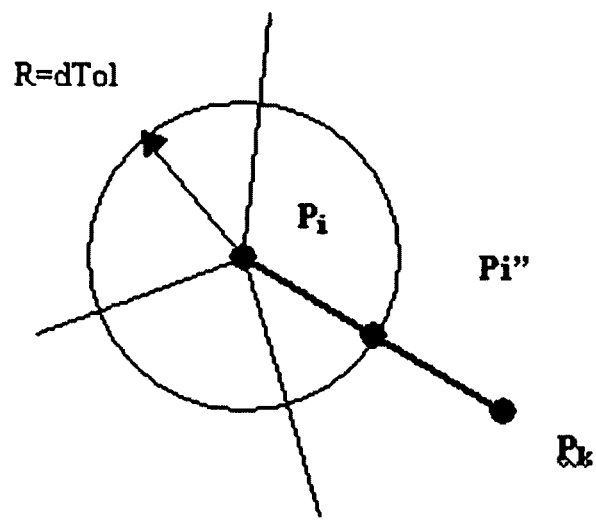

Constrained Movement: Since this smoother is most beneficial to users who are trying to modify existing meshes, add features and build geometry from them, many users would prefer the to move nodes in a constrained manner. For example, they may not want their mesh nodes to move off their current location by more than a certain amount. Once the user specifies such a node movement tolerance dTol, the nodes are moved from their present location such that they always reside within the sphere of radius R=dTol as shown in FIGS. 7A and 7B.

The new location of node i (Pi") is given by $$P_{i''} = rP_k + (1-r)P_i; \text{for } r<1 \quad (6a)$$

$$P_{i''} = rP_k; \text{for } r\geq 1 \quad (6b)$$

where $$r = \frac{dTol}{\|P_k - P_i\|} \quad (6c)$$

and Pi, Pi", and Pk are the node locations before smoothing, after constrained smoothing and after unconstrained smoothing respectively.

Region Check: While the hybrid spring system tries to reposition the node so as to relax the worst angles of the connected elements, in certain situations, it is still bound to suffer from the so-called "Laplacian distortion" effect, where, interior nodes might move outside concave boundaries. To ensure that the moved node lies inside the domain of its neighbors, a region, is defined by a bounding box of the neighbors. The node to smooth should not be moved outside this bounding box.

Let the bounding box of the neighbors be expressed as $$\Omega(X_1, X_2, Y_1, Y_2, Z_1, Z_2) \quad (7a)$$

where X1=Xmin of all the initial X's of the centroid (for quads)/incenters (for triangles) of the neighboring elements, X2=Xmax of all the initial X's of the centroid (for quads)/incenters (for triangles) of the neighbors, and Y1, Y2, Z1 and Z2 are expressed identically.

For the node movement to be valid the following conditions need to be met

New node location should lie inside bounding box Ω(X1, X2, Y1, Y2, Z1, Z2)

$$X2 \geq Px \geq X1$$

$$Y2 \geq Py \geq Y1$$

$$Z2 \geq Pz \geq Z1 \quad (7b)$$

where Px, Py, Pz denote the new coordinates of the node.

Figure 8:
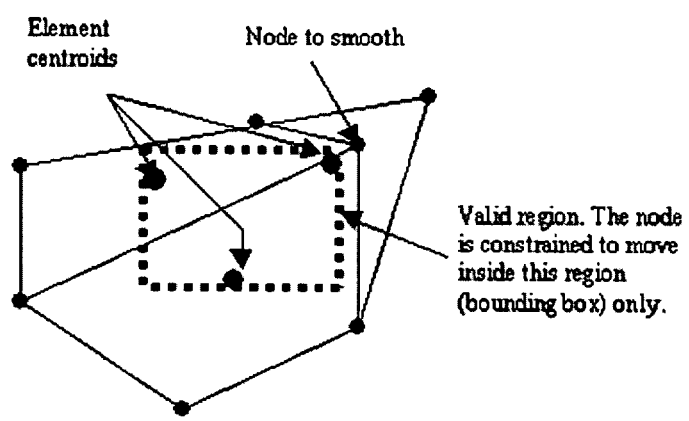
FIG. 8 shows a 2D quad-grid where the node to smooth is constrained to move within the bounding box of the three centroids of the three quads, in accordance with an embodiment of the present invention.

FIG. 8 shows a 2D quad-grid where the node to smooth is constrained to move within the bounding box of the three centroids of the three quads.

Convergence: Since most of the methods used in the variational smoothing algorithm are heuristic in nature, the error at each step can be defined by the root mean square of the positional disturbance of the mesh nodes. This can be expressed from equation (1) as $$\varepsilon_j = \sum_{i=0}^{n} (P_{i'} - P_i)^{2/n}$$

for the j-th iteration of a mesh that has n nodes. The smoother is assumed to have converged when the following criteria is met: $\epsilon_j - \epsilon_{j-1} < 0.01\epsilon_1$.

The variational logic is controlled by two factors: the valency of the node to smooth, and its element connectivity pattern. Table 2 can best express the rule set adopted.

TABLE 2

Variational smoothing logic

| Valency of node to smooth | No of Quads | No of Trias | Smoothing Method |
|---|---|---|---|
| 2 | 2 | — | Scheme E: node removed, 2 quads are combined into one |
| 3 | 3 | — | Scheme A: Isoparametric-Laplace |
| 4 | 4 | — | Scheme C: Equipotential |
| n; n > 4 | N | — | Scheme A: Isoparametric-Laplace |
| n; n > 2, n != 8 | — | n | Scheme B: Incenter-based |
| 8 | — | 8 | Scheme C: Equipotential |
| n; n > 2, n = k + 1 | K | 1 | Scheme D: Incenter-IsoLaplace |

Several unitary and large size shell meshes are smoothed using the disclosed model. Results are compared with simple Laplace or smart-Laplace smoothing cases or other existing smoothing algorithms. The ability of the smoother to clean grossly distorted meshes, maintain stability in concave and triangular regions, preserve mapped or structured meshes, improve interior angles and skewness, and converge efficiently is studied in the following subsections.

Figure 9A:
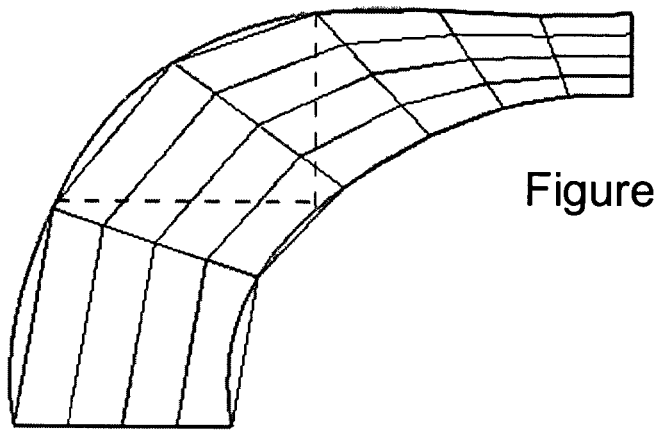
FIGS. 9A-9C illustrate some benefits of the disclosed variational smoother.
Figure 9B:
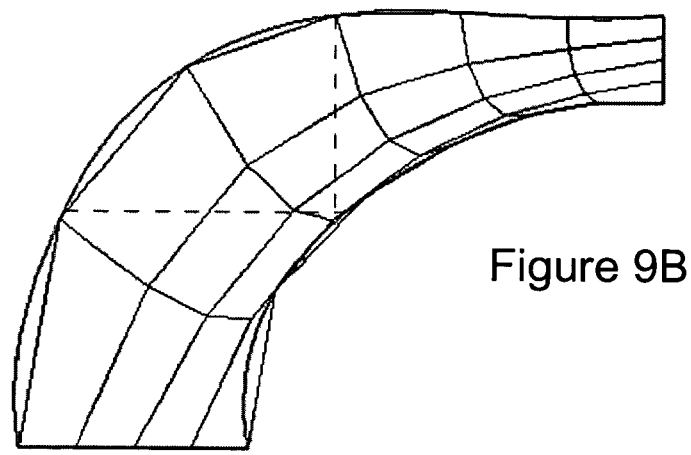
Figure 9C:
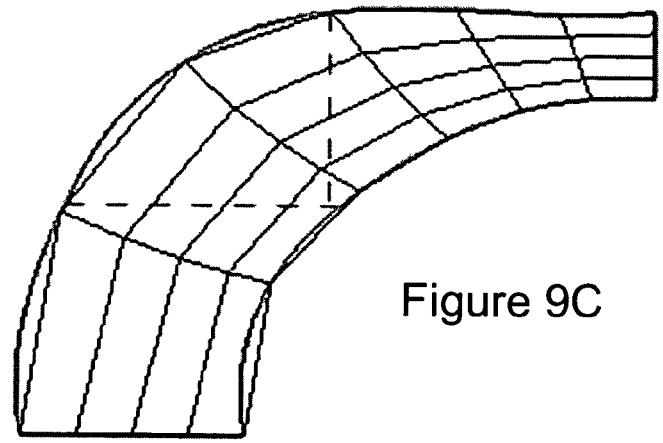

Ability to preserve mapped-meshes: Most smoothing algorithms do not recognize mapped/structured grids. The angle smoother employs a Winslow smoothing algorithm for nodes that are connected to 4 quadrilaterals or 8 triangles. The benefits of the variational smoother are illustrated in FIGS. 9A-9C. FIG. 9A shows a 4×6 mapped mesh on a concave region.

FIG. 9B shows the same mesh after Laplace smoothing. The structured nature of the mesh is lost. Edge elements have almost collapsed.

FIG. 9C shows the result of variational smoothing. All nodes are equipotentially smoothed resulting in a structured or mapped mesh pattern. No element is collapsed.

Ability to Work On Concave Boundaries: On concave domains Laplacian smoothing often pushes points outside the mesh boundary. The disclosed angle smoother prevents that either by employing a Winslow in such regions if the mesh qualifies for it or by a region check. FIGS. 9A-9C show a 5×6 mapped mesh distorted by Laplacian smoothing but completely preserved by the current method.

Distortions caused by Laplacian smoothing in concave domains by throwing nodes outside the mesh region and creating inverting elements can also be prevented by the region check feature of the variational smoother.

Figure 10A:
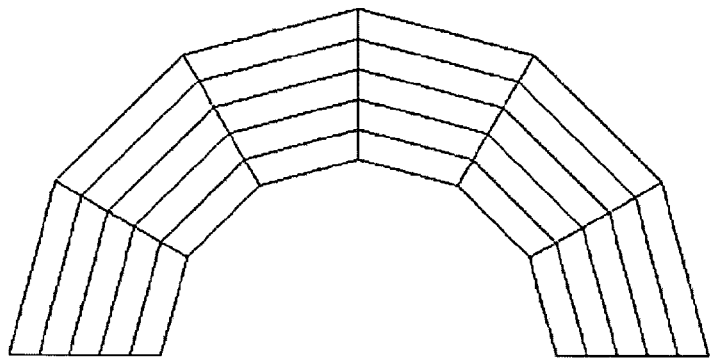
FIGS. 10A-10C show a 5×6 mapped all quad mesh in a concave region, in accordance with an embodiment of the present invention.
Figure 10B:
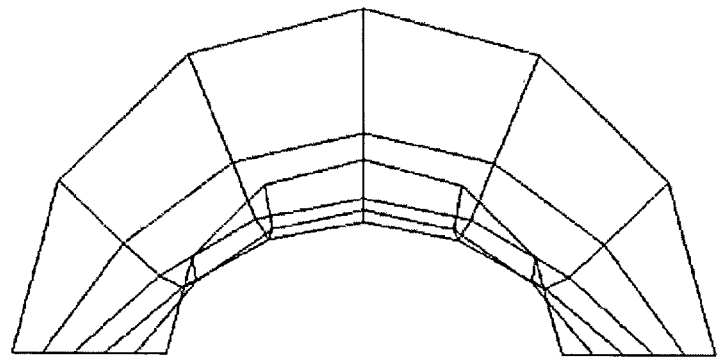
Figure 10C:
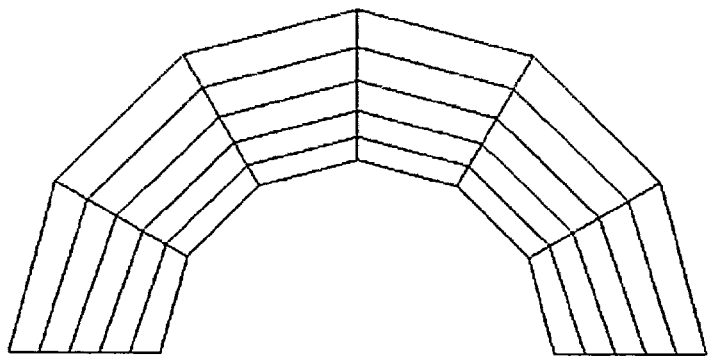

FIG. 10A shows a 5×6 mapped all quad mesh in a concave region. FIG. 10B shows the result of Laplace smoothing, where nodes move outside the boundary resulting in inverted elements. FIG. 10C shows the result of the disclosed variational smoothing, where no nodes go outside the boundary and the mesh has not been significantly moved.

Figure 11:
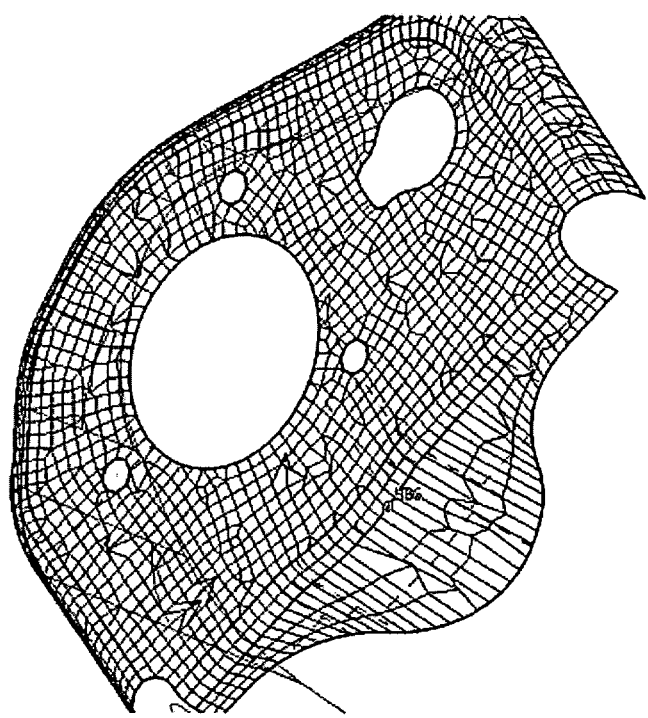
FIG. 11 shows a portion of an exemplary car body panel that has an initial distorted mesh.
Figure 12:
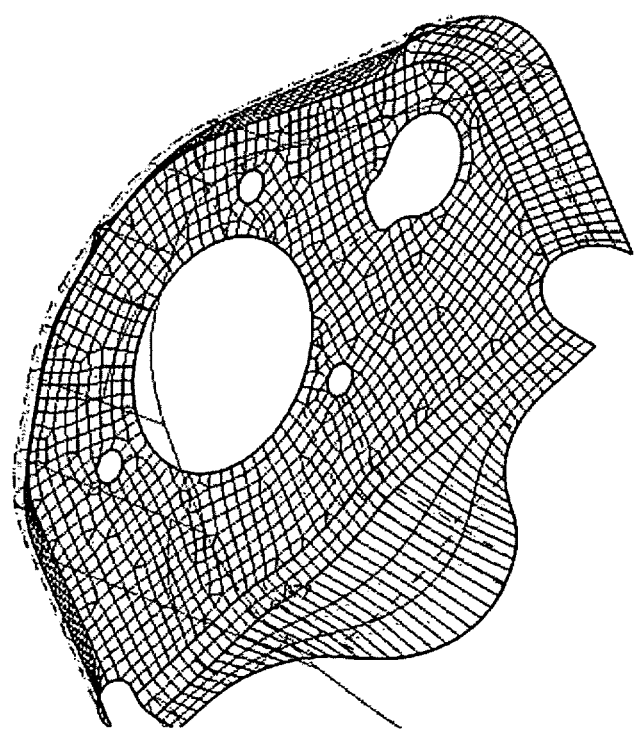
FIG. 12 shows a mesh smoothed by a variational smoothing process in accordance with a preferred embodiment.

Ability to Smooth Quad-dominant meshes: FIG. 11 shows a portion of a car body panel that has an initial distorted mesh which is cleaned by the variational smoother as shown in FIG. 12. Table 3 compares the performance of the angle smoother to smart-Laplacian smoothing. Once again, it is observed that the number of elements failing included angle check for the angle smoother is half of that produced by smart-Laplacian smoothing.

FIG. 11 shows a portion of a carbody panel with quad dominant mesh, partially mapped mesh with high-skew elements.

FIG. 12 shows a mesh smoothed by the new variational smoother. All elements are smoothed. Resultant mesh shows mapped grids have been preserved, most high skew elements cured.

TABLE 3

Comparison of mesh quality for a car-body panel

| Smoothing Method | No. of elm failing warp check | No. of elem failing minimum Jacobian check | No. of elem failing skew check | No. of elem failing included angle check |
|---|---|---|---|---|
| Original mesh | 37 | 89 | 241 | 156 |
| After Laplace smoothing | 5 | 2 | 89 | 31 |
| After variational smoothing | 1 | 2 | 63 | 15 |

Laplacian smoothing or its variants have certain inherent shortcomings that cannot be cured by a single alternate smoothing algorithm. More over, most schemes are restricted to either two-dimensional or monolithic grids. The variational smoother of the preferred embodiment uses a hybrid smoothing mechanism where different smoothing (both conventional and innovative) algorithms are used for each node depending on its connectivity. For all triangular meshes, an incenter-based method is disclosed that performs better and less destructively than the Laplacian method. For all quadrilateral meshes, an Isoparametric-Laplace method is used that leads to faster convergence and lower skewness. Winslow smoothing is employed for mapped-grid units that preserves structured grids and is non-destructive in concave domains. The method is made more flexible by adding an user control on the element check criteria (included angle or skew) and is further reinforced by a quick region check that often ensures valid meshes in skew and concave contours. Several results exemplify the performance of the disclosed variational smoother in comparison to a conventional Laplacian, smart-Laplacian and other schemes.

Figure 13:
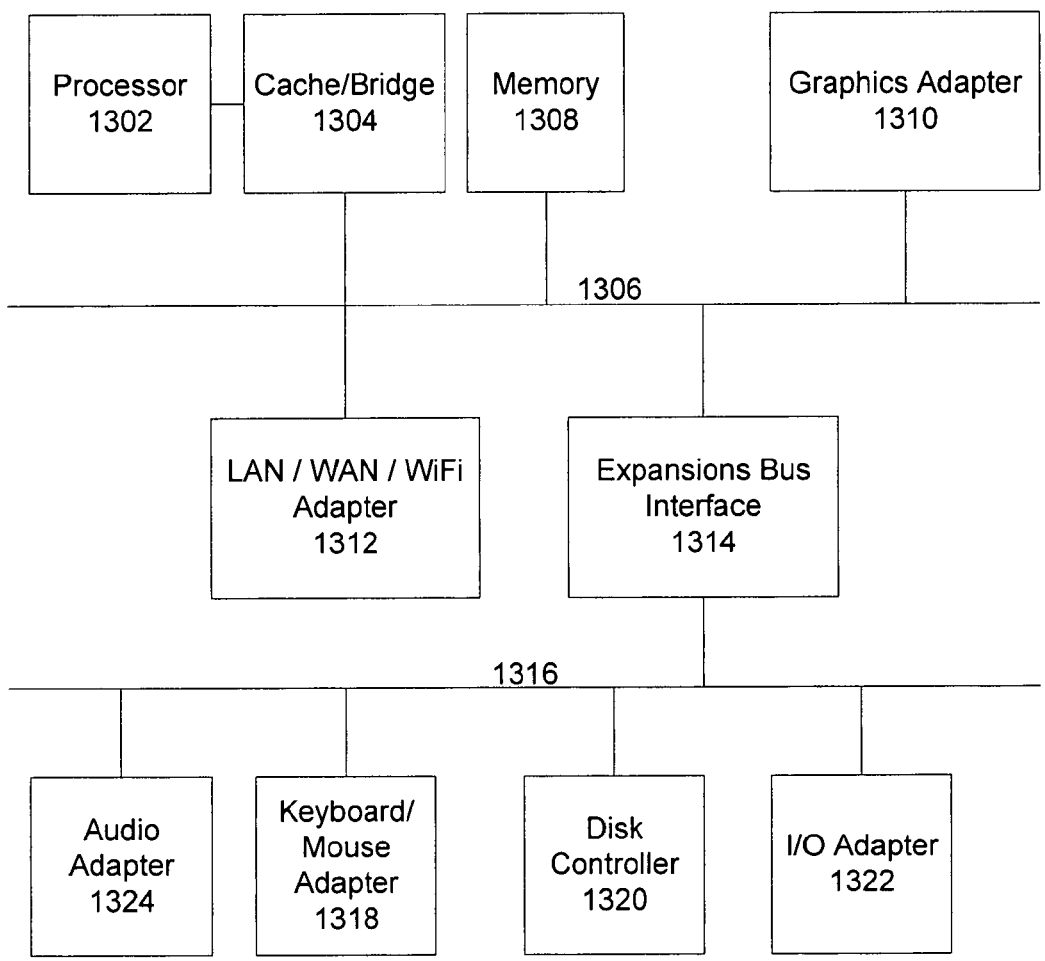
FIG. 13 depicts a block diagram of a data processing system in which a preferred embodiment can be implemented.

FIG. 13 depicts a block diagram of a data processing system in which a preferred embodiment can be implemented. The data processing system depicted includes a processor 1302 connected to a level two cache/bridge 1304, which is connected in turn to a local system bus 1306. Local system bus 1306 may be, for example, a peripheral component interconnect (PCI) architecture bus. Also connected to local system bus in the depicted example are a main memory 1308 and a graphics adapter 1310.

Other peripherals, such as local area network (LAN)/Wide Area Network/Wireless (e.g. WiFi) adapter 1312, may also be connected to local system bus 1306. Expansion bus interface 1314 connects local system bus 1306 to input/output (I/O) bus 1316. I/O bus 1316 is connected to keyboard/mouse adapter 1318, disk controller 1320, and I/O adapter 1322.

Also connected to I/O bus 1316 in the example shown is audio adapter 1324, to which speakers (not shown) may be connected for playing sounds. Keyboard/mouse adapter 1318 provides a connection for a pointing device (not shown), such as a mouse, trackball, trackpointer, etc.

Those of ordinary skill in the art will appreciate that the hardware depicted in FIG. 13 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system, optionally employing a graphical user interface. When a graphical user interface is employed, the operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as Unix, Linux, or a version of Microsoft Windows™, a product of Microsoft Corporation located in Redmond, Wash. may be employed if suitably modified. The operating system is modified or created in accordance with the present invention as described.

Figure 14:
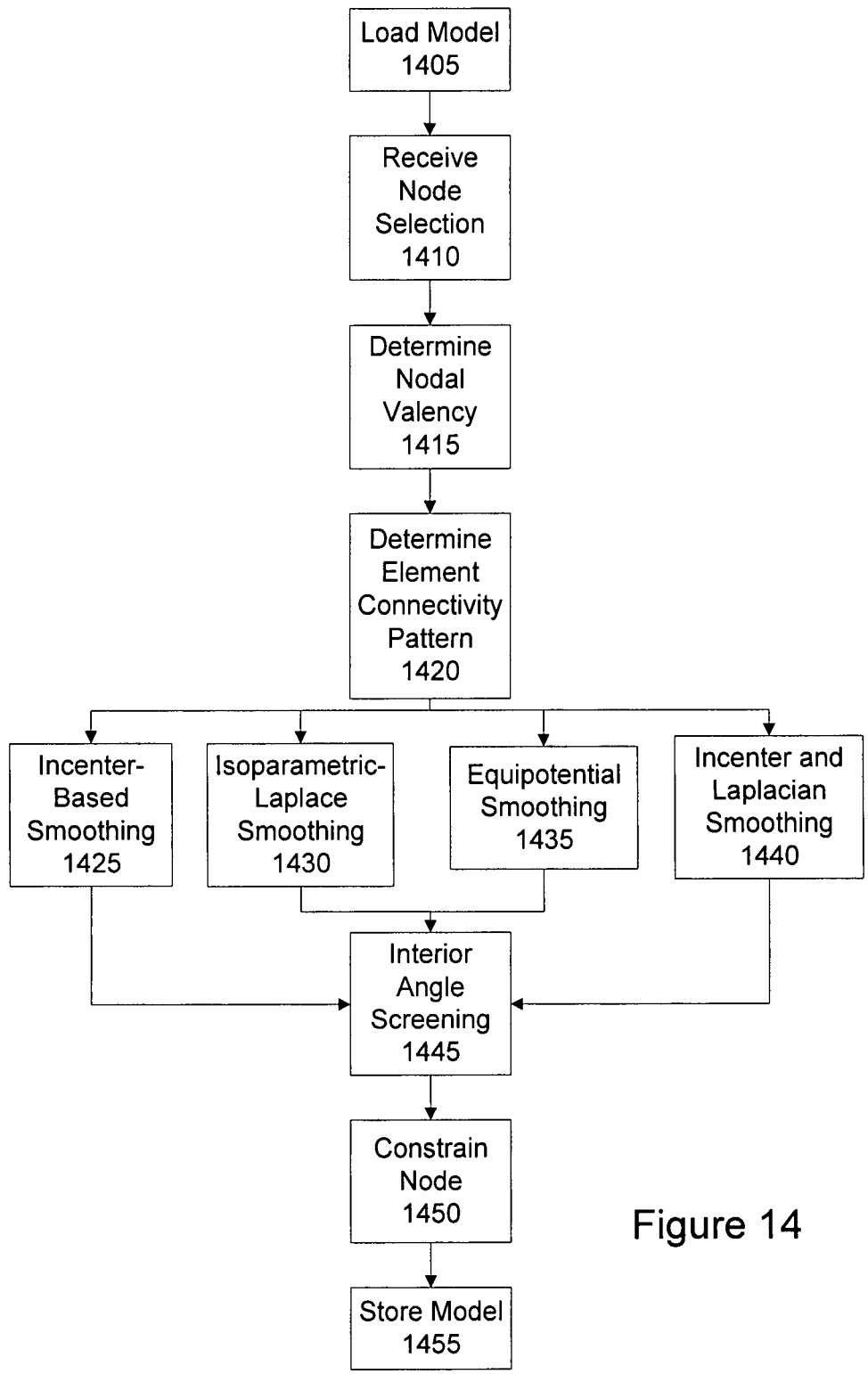
FIG. 14 depicts a flowchart of a process in accordance with a preferred embodiment.

FIG. 14 depicts a flowchart of a process in accordance with a preferred embodiment. Here, a finite element model is first loaded into a data processing system (step 1405). It should be noted that the model is not necessarily loaded as a graphic image, but can be loaded as data that describes the model, as known to those of skill in the art. Next, a node of the model is selected for smoothing (step 1410). Further, it should be noted that while the preferred embodiments are drawn to finite element models, these methods can also be applied to more simple graphic models.

The selected node is then analyzed. The nodal valency of the node is determined (step 1415), and the element connectivity pattern of the node is determined (step 1420).

Next, the node is smoothed according to the nodal valency and element connectivity pattern. If the element connectivity pattern is a triangle, incenter-based smoothing is performed (step 1425); if the element connectivity pattern is quad-only mesh, isoparametric-Laplace smoothing is performed (step 1430); if the element connectivity pattern is a mapped region, equipotential smoothing is performed (step 1435); and if the element connectivity pattern is a free-mixed mesh, combined incenter and Laplacian smoothing is used (step 1440).

Preferably, the smoothing of the node is performed according using:

$$Pi' = \sum_{n=1}^{N} Fn(C, V) * \Omega n(C, V)$$

where i is the node to be smoothed, i is connected to N elements, Pi' is the new position of node i, Fn is the variational weight factor for n-th element $\Omega n$ is the positional function for n-th element, C denotes the connectivity pattern of the node, and V indicates the valency of the node.

Next, the system optionally performs an interior angle screening (step 1445), according to user-specified criteria, and optionally constrains the node to move within a predetermined tolerance (step 1450).

The modified model is then stored (step 1455).

Further details of mesh smoothing and processing techniques can be found in the following, all of which are hereby incorporated by reference: Amenta, N., Bern, M. and Eppstein, D. (1997) Optimal point placement for mesh smoothing. Proc. 8th ACM-SIAM Symp. On Discrete Algorithms, New Orleans, La.; Balendra, B. (1999) A direct smoothing method for surface meshes. Proc. 8th Intl. Meshing Roundtable, Sandia National Laboratories, 303-308; Bossen, F. J. and Heckbert, P. S. (1996) A pliant method for anisotropic mesh generation. Proc. 5th Intl. Meshing Roundtable, Sandia National Laboratories, 63-74; Canann, S. A., Tristano, J. R. and Staten, M. L. (1998) An approach to combined Laplacian and Optimization-based smoothing for triangular, quadrilateral and quad-dominant meshes. 7th Intl. Meshing Roundtable, Sandia National Laboratories; Field, D. (1988) Laplacian smoothing and Delauney triangulations. Comm. App. Num. Meth, 4, 709-712; Freitag, L., Jones, M. and Plassmann, P. (1995) An efficient parallel algorithm for mesh smoothing. Proc. 4th Intl. Meshing Roundtable, Sandia National Laboratories, 47-58; Freitag, L. and Oliver-Gooch, C. (1997) A comparison of tetrahedral mesh improvement techniques. Proc. 6th Intl. Meshing Roundtable, Sandia National Laboratories, 249-262; Freitag, L. (1997) On combining Laplacian and optimization-based mesh smoothing techniques. ASME, 220, 37-43; Haber, R. Shephard, M. S., Abel, J. F., Gallagher, R. H., and Greenberg, D. P. (1981) A general two-dimensional, graphical finite element preprocessor utilizing discrete transfinite mappings. IJNME 17, 1015-1044; Ives, D. (2000) Unstructured boundary layer grid generation. Proc. 7th Intl. Conf. Num. Grid Generation in Computational Field Simulations, British Columbia, Canada, 13-19; Jacquotte, O. P. and Coussement, G. (1992) Structured mesh adaptation: space accuracy and interpolation methods. Comp. Meth. App. Mech. Engg, 101 397-432; Jones, R. E. (1977) A self-organizing mesh generation program. J. Pressure Vessel Tech, ASME, 96(3), 193-199; Lee, C. K. and Lo, S. H. (1994) A new scheme for the generation of a graded quadrilateral mesh. Comp. Struct. 52(5), 847-857; Lo, S. (1985) A new mesh generation scheme for arbitrary planar domains. IJNME, 21, 1403-1426; Lohner, R., Morgan, K. and Zienkiewicz, O. C. (1986) Adaptive grid refinement for the compressible Euler equations. Accuracy estimates and adaptive refinements in finite element computations, Ed. I. Babuska, O. C. Zienkiewicz, J. Gago and E. R. de A. Oliviera, Wiley, 281-297; Parthasarathy, V. and Kodiyalam, S. (1991) A constrained optimization approach to finite element mesh smoothing. J. Fin. Elm. Anal. Des, 9, 309-320; Shephard, M. S. and Georges, M. (1991) Automatic three-dimensional mesh generation by the finite octree technique. IJNME, 32, 709-749: Shimada, K. (1993) Physically-based mesh generation:automated triangulation of surfaces and volumes via bubble packing. PhD Thesis, ME Dept., MIT; Tam, T. K. H. and Armstrong, C. G. (1993) Finite element mesh control by integer programming. IJNME, 36, 2581-2606; Zhou, T. and Shimada, K. (2000) An angle-based approach to two-dimensional mesh smoothing. Proc. 9th Intl. Meshing Roundtable, Sandia National Laboratories, 373-384; and Knupp, P. (1998) Winslow Smoothing On Two-Dimensional Unstructured Meshes. Proc. 7th Intl. Meshing Roundtable, Sandia National Laboratories, 449-457; Knupp, P. (1999) Applications of Mesh Smoothing: Copy, Morph, and Sweep on Unstructured Quadrilateral Meshes", IJNME, Wiley, Vol 45, 37-45.

Those skilled in the art will recognize that, for simplicity and clarity, the full structure and operation of all data processing systems suitable for use with the present invention is not being depicted or described herein. Instead, only so much of a system and method as is unique to the present invention or necessary for an understanding of the present invention is depicted and described. The remainder of the construction and operation of the system and method may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method, comprising:
   loading, in a data processing system, a model having a plurality of interconnected nodes forming an orphaned shell mesh;
   receiving a selection of a first node of the model;
   determining a first nodal valency of the first node;
   determining a first element connectivity pattern of the first node;
   performing a smoothing operation on the first node according to the first nodal valency and the first element connectivity pattern to produce a smoothed mesh of the model at the first node;
   determining a second nodal valency of a second node of the model, the second nodal valency different from the first nodal valency;
   determining a second element connectivity pattern of the second node, the second element connectivity pattern different from the first element connectivity pattern;
   performing a smoothing operation on the second node according to the second nodal valency and the second element connectivity pattern to produce a smoothed mesh of the model at the second node, the smoothing operation performed on the second node being of a different smoothing method than the smoothing operation performed on the first node; and
   storing the model.

2. The method of claim 1, wherein the first element connectivity pattern is one of a triangle, a mapped region, and a free-mixed mesh, and
   when the first element connectivity pattern is a triangle, then incenter-based smoothing is performed on the first node;
   when the first element connectivity pattern is a mapped region, then equipotential smoothing is performed on the first node; and
   when the first element connectivity pattern is a free-mixed mesh, then combined incenter and laplacian smoothing is performed on the first node, and
   wherein the incenter-based smoothing determines a new position $P_i'$ of the first node as $$P_i' = P_i + \sum_{n=1}^{N} W_n(P_n - P_i)$$

where
   i represents the first node,
   $P_i(x, y, z)$ is a position vector of the first node,
   $P_n(x, y, z)$ is an incenter vector of an element n connected to the first node,
   N represents a total number of elements connected to the first node, and
   $W_n$ represents a weighing factor.

3. The method of claim 2, wherein $$W_n = \frac{\|V_n\|}{\sum_{n=1}^{N} \|V_n\|},$$

$V_n = P_n - P_i$, and $V_n$ is a distance from the first node to an incenter of the element n.

4. The method of claim 1, wherein the smoothing of the first node is performed using $$P_i' = \sum_{n=1}^{N} F_n(C, V) * \Omega_n(C, V)$$

and wherein i is the node to be smoothed, i is connected to N elements, $P_i'$ is the new position of node i, $F_n$ is a variational weight factor for n-th element, $\Omega_n$ is a positional function for n-th element, C denotes the first element connectivity pattern of the first node, and V indicates the first nodal valency of the first node.

5. The method of claim 1, further comprising performing an interior angle screening process.

6. The method of claim 1, wherein
   when the second element connectivity pattern is a triangle, then incenter-based smoothing is performed on the second node;
   when the second element connectivity pattern is a quad-only mesh, then isoparametric Laplace smoothing is performed on the second node;
   when the second element connectivity pattern is a mapped region, then equipotential smoothing is performed on the second node; and when the second element connectivity pattern is a free-mixed mesh, then combined incenter and laplacian smoothing is performed on the second node.

7. A data processing system comprising:
a processor; and
an accessible memory, the data processing system configured to perform the steps of
loading a graphic model having a plurality of interconnected nodes forming an orphaned shell mesh;
receiving a selection of a first node of the graphic model;
determining a first nodal valency of the first node;
determining a first element connectivity pattern of the first node;
performing a smoothing operation on the first node according to the first nodal valency and the first element connectivity pattern to produce a smoothed mesh of the model at the first node;
determining a second nodal valency of a second node of the model, the second nodal valency different from the first nodal valency;
determining a second element connectivity pattern of the second node, the second element connectivity pattern different from the first element connectivity pattern;
performing a smoothing operation on the second node according to the second nodal valency and the second element connectivity pattern to produce a smoothed mesh of the model at the second node, the smoothing operation performed on the second node being of a different smoothing method than the smoothing operation performed on the first node; and
storing the model.

8. The data processing system of claim 7, wherein the first element
connectivity pattern is one of a triangle, a mapped region, and a free-mixed mesh, and
when the first element connectivity pattern is a triangle, then incenter-based smoothing is performed on the first node;
when the first element connectivity pattern is a mapped region, then equipotential smoothing is performed on the first node; and
when the first element connectivity pattern is a free-mixed mesh, then combined incenter and laplacian smoothing is performed on the first node, and
wherein the incenter-based smoothing determines a new position $P_i'$ of the first node as $$P_i' = P_i + \sum_{n=1}^{N} W_n(P_n - P_i)$$

where
i represents the first node,
$P_i(x, y, z)$ is a position vector of the first node,
$P_n(x, y, z)$ is an incenter vector of an element n connected to the first node,
N represents a total number of elements connected to the first node, and
$W_n$ represents a weighing factor.

9. The data processing system of claim 8, wherein $$W_n = \frac{\|V_n\|}{\sum_{n=1}^{N} \|V_n\|},$$

$V_n = P_n - P_i$, and $V_n$ is a distance from the first node to an incenter of the element n.

10. The data processing system of claim 7, wherein the smoothing of the first node is performed using $$P_i' = \sum_{n=1}^{N} F_n(C, V) * \Omega_n(C, V)$$

and wherein i is the node to be smoothed, i is connected to N elements, $P_i'$ is a new position of node i, $F_n$ is a variational weight factor for n-th element, $\Omega_n$ is a positional function for n-th element, C denotes the first element connectivity pattern of the first node, and V indicates the first nodal valency of the first node.

11. The data processing system of claim 7, further configured to perform the step of performing an interior angle screening process.

12. The data processing system of claim 7, wherein
when the second element connectivity pattern is a triangle, then incenter-based smoothing is performed on the second node;
when the second element connectivity pattern is a quad-only mesh, then isoparametric-Laplace smoothing is performed on the second node;
when the second element connectivity pattern is a mapped region, then equipotential smoothing is performed on the second node; and
when the second element connectivity pattern is a free-mixed mesh, then combined incenter and laplacian smoothing is performed on the second node.

13. A non-transitory machine-readable medium encoded with executable instructions that, when executed, cause a data processing system to:
load a graphic model having a plurality of interconnected nodes forming an orphaned shell mesh;
receive a selection of a first node of the graphic model;
determine a first nodal valency of the first node;
determine a first element connectivity pattern of the first node;
perform a smoothing operation on the first node according to the first nodal valency and the first element connectivity pattern to produce a smoothed mesh of the model at the first node;
determine a second nodal valency of a second node of the model, the second nodal valency different from the first nodal valency;
determine a second element connectivity pattern of the second node, the second element connectivity pattern different from the first element connectivity pattern;
perform a smoothing operation on the second node according to the second nodal valency and the second element connectivity pattern to produce a smoothed mesh of the model at the second node, the smoothing operation performed on the second node being of a different smoothing method than the smoothing operation performed on the first node; and
store the model.

14. The machine-readable medium of claim 13, wherein
if the first element connectivity pattern is a triangle, then incenter-based smoothing is performed on the first node;
if the first element connectivity pattern is a mapped region, then equipotential smoothing is performed on the first node; and
if the first element connectivity pattern is a free-mixed mesh, then combined incenter and laplacian smoothing is performed on the first node, and wherein the incenter-based smoothing determines a new position $P_i'$ of the first node as $$P_i' = P_i + \sum_{n=1}^{N} W_n(P_n - P_i)$$

where
i represents the first node,
$P_i(x, y, z)$ is a position vector of the first node,
$P_n(x, y, z)$ is an incenter vector of an element n connected to the first node,
N represents a total number of elements connected to the first node, and
$W_n$ represents a weighing factor.

15. The machine-readable medium of claim 14, wherein $$W_n = \frac{\|V_n\|}{\sum_{n=1}^{N} \|V_n\|},$$

$V_n = P_n - P_i$, and $V_n$ is a distance from the first node to an incenter of the element n.

16. The machine-readable medium of claim 13, wherein the smoothing of the first node is performed according using $$Pi' = \sum_{n=1}^{N} F_n(C, V) * \Omega_n(C, V)$$

and wherein i is the node to be smoothed, i is connected to N elements, $P_i'$ is a new position of node i, $F_n$ is a variational weight factor for n-th element, $\Omega_n$ is a positional function for n-th element, C denotes the first element connectivity pattern of the first node, and V indicates the first nodal valency of the first node.

17. The machine-readable medium of claim 13, further comprising instructions for performing an interior angle screening process.

18. The machine-readable medium of claim 13, wherein
when the second element connectivity pattern is a triangle, then incenter-based smoothing is performed on the second node;
when the second element connectivity pattern is a quad-only mesh, then isoparametric-Laplace smoothing is performed on the second node;
when the second element connectivity pattern is a mapped region, then equipotential smoothing is performed on the second node; and
when the second element connectivity pattern is a free-mixed mesh, then combined incenter and laplacian smoothing is performed on the second node.

* * * * *